(12) United States Patent
Fanucci et al.

(10) Patent No.: US 7,854,410 B2
(45) Date of Patent: Dec. 21, 2010

(54) POWERED UNMANNED AERIAL VEHICLE

(75) Inventors: Jerome P. Fanucci, Lexington, MA (US); Nathan Gravelle, Amesbury, MA (US); Stephen A. Schoenholtz, Melrose, MA (US)

(73) Assignee: Kazak Composites, Incorporated, Woburn, MA (US)

( * ) Notice: Subject to any disclaimer, the term of this patent is extended or adjusted under 35 U.S.C. 154(b) by 856 days.

(21) Appl. No.: 11/803,720

(22) Filed: May 15, 2007

(65) Prior Publication Data

US 2010/0012774 A1    Jan. 21, 2010

Related U.S. Application Data

(60) Provisional application No. 60/800,444, filed on May 15, 2006.

(51) Int. Cl.
*B64C 3/56* (2006.01)
*B64D 17/70* (2006.01)

(52) U.S. Cl. .......................... 244/49; 244/139

(58) Field of Classification Search ................ 244/3.28, 244/49, 113, 58, 139, 147–149; 416/140–142
See application file for complete search history.

(56) References Cited

U.S. PATENT DOCUMENTS

| 2,941,764 | A |   | 6/1960  | Lee, Jr. et al. |
|-----------|---|---|---------|-----------------|
| 3,568,201 | A |   | 3/1971  | Spoonamore et al. |
| 3,957,229 | A | * | 5/1976  | Davis ........................ 244/58 |
| 3,978,790 | A |   | 9/1976  | Sandelius |
| 4,614,318 | A |   | 9/1986  | Gobel |
| 4,944,226 | A |   | 7/1990  | Wedertz et al. |
| 5,048,773 | A | * | 9/1991  | Washington et al. ....... 244/3.28 |
| 5,279,199 | A |   | 1/1994  | August |
| 5,642,867 | A |   | 7/1997  | Klestadt |
| 5,760,330 | A |   | 6/1998  | Himmert et al. |
| 5,780,766 | A |   | 7/1998  | Schroppel |
| 6,056,237 | A |   | 5/2000  | Woodland |
| 6,073,879 | A | * | 6/2000  | Sokolovsky et al. ...... 244/3.28 |
| 6,082,675 | A |   | 7/2000  | Woodall, Jr. et al. |
| 6,260,797 | B1| * | 7/2001  | Palmer ....................... 244/49 |
| 6,308,632 | B1| * | 10/2001 | Shaffer ..................... 416/142 |
| 6,494,140 | B1|   | 12/2002 | Webster |
| 6,576,880 | B2| * | 6/2003  | Martorana et al. ............ 244/49 |
| 6,808,144 | B1| * | 10/2004 | Nicolai et al. ............... 244/139 |
| 6,880,780 | B1|   | 4/2005  | Perry et al. |
| 7,100,865 | B2|   | 9/2006  | Byrne et al. |
| 7,252,270 | B2|   | 8/2007  | Mitzmacher |
| 7,262,395 | B2|   | 8/2007  | Bilyk et al. |
| 2007/0018033 | A1 | | 1/2007 | Fanucci et al. |
| 2008/0035786 | A1 | | 2/2008 | Bilyk et al. |

* cited by examiner

*Primary Examiner*—Galen Barefoot
(74) *Attorney, Agent, or Firm*—Weingarten, Schurgin, Gagnebin & Lebovici LLP

(57) ABSTRACT

An unmanned aerial vehicle mounts a payload section to an air delivery vehicle. The air delivery vehicle includes deployable wings and tail fins for gliding or powered flight. A set of propeller blades are provided for powered flight. The propeller blades are mounted for movement from a stowed position to deployed position extending radially from the fuselage for powered flight.

17 Claims, 9 Drawing Sheets

US 7,854,410 B2

POWERED UNMANNED AERIAL VEHICLE

CROSS REFERENCE TO RELATED APPLICATIONS

This application claims the benefit under 35 U.S.C. §119 (e) of U.S. Provisional Patent Application No. 60/800,444, filed on May 15, 2006, the disclosure of which is incorporated by reference herein.

STATEMENT REGARDING FEDERALLY SPONSORED RESEARCH OR DEVELOPMENT

N/A

BACKGROUND OF THE INVENTION

Unmanned aerial vehicles (UAVs) have been used for a variety of purposes, such as reconnaissance or delivery of payloads. UAVs are powered aircraft with no human operator. They may fly autonomously or may be piloted remotely. Some UAVs are recoverable, while others are expendable after one flight. An example of a UAV is described in US Published Patent Application No. 2007-0018033, the disclosure of which is incorporated by reference herein.

SUMMARY OF THE INVENTION

The present invention relates to a powered unmanned aerial vehicle to provide extended flight to a target region before, for example, falling to earth.

More particularly, the vehicle includes two sections. An air delivery vehicle is located in the aft portion of the vehicle. A payload section is attached to the front of the air delivery vehicle, either releasably or fixedly. The payload section can be adjusted to carry any payload meeting appropriate weight and volume constraints. A pair of wings is pivotably mounted to the fuselage of the air delivery vehicle for movement from a stowed position against the fuselage to a deployed position extending from the fuselage. A plurality of tail fins is pivotably mounted to the fuselage aft of the wings for movement from a stowed position against the fuselage to a deployed position extending from the fuselage.

A set of propeller blades is mounted to the vehicle, either aft or forward, allowing for movement from a stowed position to a deployed position extending radially from the fuselage axis during powered flight. A drive source such as an electric motor is provided for driving the propeller blades in the deployed position about the axis of the fuselage.

When the aerial vehicle arrives at the target area, the payload, such as a sensor, can be released from the air delivery vehicle, or the vehicle and payload can remain together for the duration of the mission. If the payload section separates, the air delivery vehicle may fall to earth or alternatively may continue its mission, such as deploying other sensors at a different location. Additionally, the vehicle itself may be configured to serve as a nonseparable sensor in addition to carrying separable sensors.

In a further embodiment, the air delivery vehicle is recoverable. A recovery parachute is stowed in the forward payload section. Upon deployment, the parachute extends from the payload section. Alternatively, a connection runs between the stowed parachute and the tail of the unmanned aerial vehicle. Upon deployment, the parachute enters the airstream and is carried aft by its own drag, clearing the wings and fins.

DESCRIPTION OF THE DRAWINGS

The invention will be more fully understood from the following detailed description taken in conjunction with the accompanying drawings in which.

DETAILED DESCRIPTION OF THE INVENTION

Figure 1:
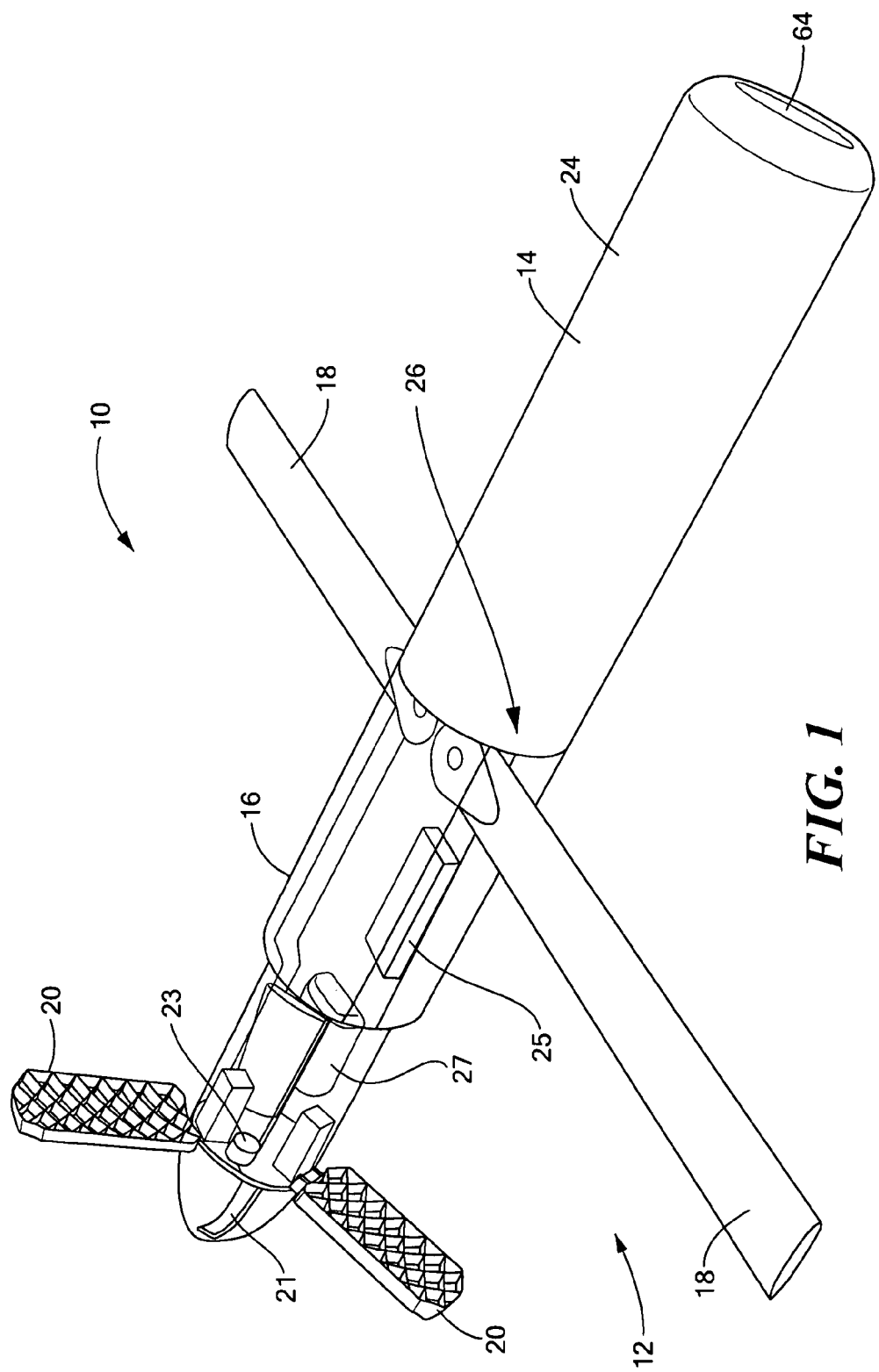
FIG. 1 is an isometric view of an aerial delivery system deployed in flight.
Figure 2:
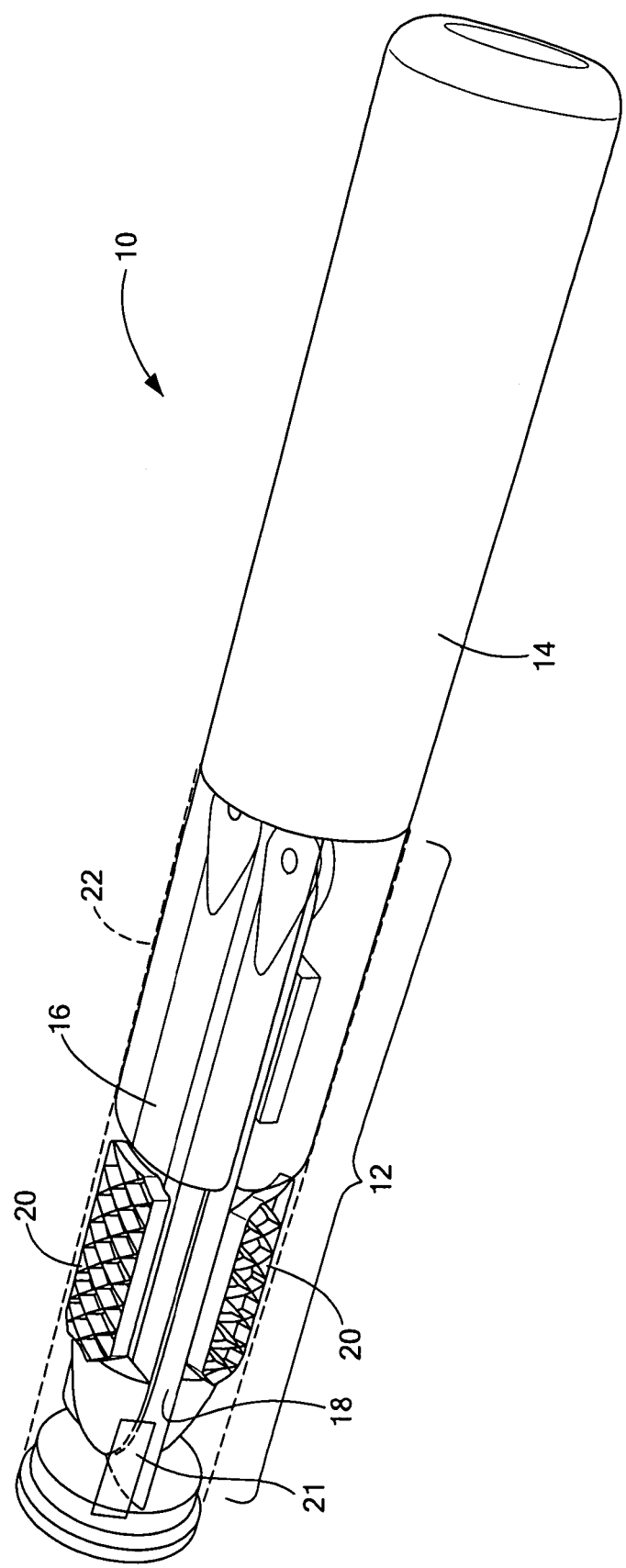
FIG. 2 is an isometric view of the aerial delivery system of FIG. 1 in a stowed configuration.

Referring to FIGS. 1 and 2, a unmanned aerial vehicle (UAV) 10 of the present invention includes an air delivery vehicle (ADV) 12 and a payload section 14. The payload section depends on the application. For instance, it may include a suite of sensors, for example, for meteorological data gathering or a surveillance operation. The ADV houses some or all of the components for operating the UAV in flight. For example, in one embodiment, the air delivery vehicle includes a fuselage 16 to which deployable wings 18, tail fins 20, and propeller blades 21 are attached. Any necessary actuators, sensors, autopilot 25, and power source(s) 27 may be mounted to the ADV as well. In the stowed configuration (FIG. 2), the wings, tail fins, and propeller blades are folded against the fuselage and packaged within a cylindrical sleeve 22. The payload section is contained within a forward cylindrical housing or shell 24. In another embodiment, some components, such as the propeller blades, a power source, and sensors, and may be housed in the payload section. See FIGS. 6-7.

Figure 3:
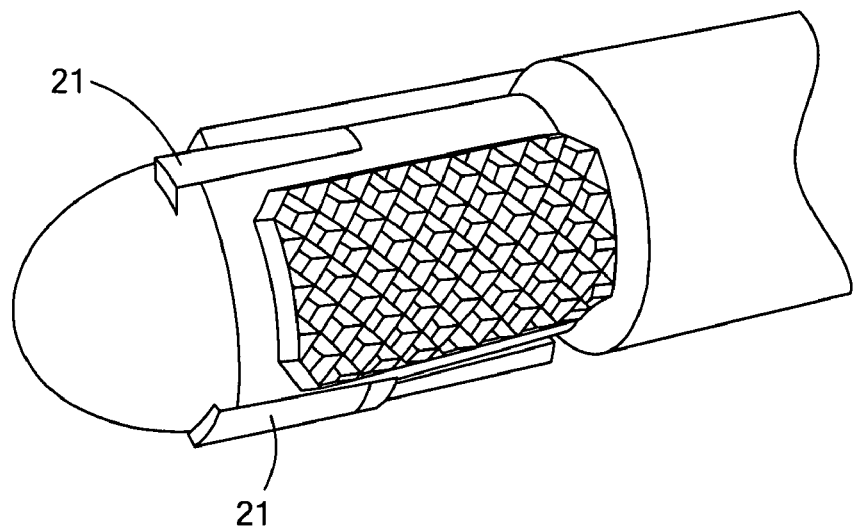
FIG. 3 is a partial isometric view of the aerial vehicle of the aerial delivery system with a set of propeller blades in a stowed configuration.

The unmanned aerial vehicle can be launched in any suitable manner, such as from existing launch tubes on aircraft that are used, for example, to launch sonobuoys or from a ground based launch system. Upon deployment from an aircraft or ground based launch system, the cylindrical sleeve 22 is pulled off or removed from the air delivery vehicle 12, and the deployable wings 18 and tail fins 20 open out. In one embodiment, aft-mounted propeller blades 21 may stream aft. See FIG. 3. Prior to powering the propeller blades, the air delivery vehicle operates as an unpowered glide vehicle and glides to a target region. Upon reaching the target region, the set of propeller blades 21 driven by a drive source 23 such as an electric motor is activated for powered flight. Alternatively, the propeller blades may deploy and be activated soon after launch. The electric motor is powered by a suitable energy source, such as a battery. Suitable batteries for powering UAVs include silver-zinc, lithium polymer, zinc-air, and thermal batteries. Other power sources, such as carbon-based liquid fuels and internal combustion engines, can also be used.

Prior to launch, a flight plan (waypoints) is downloaded to an autopilot within the UAV via a suitable port or remotely via IR or other wireless connection. The flight plan can be programmed to fly around obstacles or to approach the target region from a direction that masks the actual launch point. Systems for changing a planned flight path during flight or for continuous active control can alternatively be used. The UAV is loaded into the launch system and readied for launch. The UAV system is designed so that upon launch the UAV can acquire a level attitude as quickly as possible to minimize altitude loss.

The UAV can be launched in any suitable manner, for example, using a cartridge actuated device (CAD) explosive charge to cause severance of a launch container breakout cap as is known from prior art sonobuoy deployment from an aircraft. In this case, shortly after exiting the launch tube, a parachute opens, for example, in a manner known in the art, and orients the UAV relative to the local airflow during descent. After a few seconds, the UAV is aligned with the airflow and descending. At this point, the parachute is severed from the UAV in any suitable manner, such as with burn-through resistors (not shown). Release of the parachute pulls the sleeve off the UAV and releases the spring-loaded deployable wing and tail surfaces and propeller blades.

The UAV can initially glide unpowered towards the target, converting potential energy (altitude) to range without expenditure of battery energy. Alternatively, the UAV can begin powered flight earlier, such as soon after launch. The autopilot is programmed to optimize and maintain vehicle airspeed to reach the target. Upon reaching a desired location, the propellers, if not activated earlier in the launch cycle, are activated via the electric motor or other power source to rotate about the axis of the fuselage to provide powered flight. The UAV cruises at a desired speed, for example, 150 knots. A two-way data link can be provided in the vehicle to allow data from the sensors in the payload to be transmitted to a remotely located operator and/or allow the operator to continually update the flight path. A digital data link provides the capability for data compression and storage, encryption and burst communication modes. Alternatively, the vehicle may be used to deploy autonomous sensors (either remaining with the vehicle for the entire mission, or released at some appropriate point) requiring no interaction from the delivery vehicle for the payload to serve its mission independently from any interaction with the vehicle other than to serve as its transport.

Figure 4:
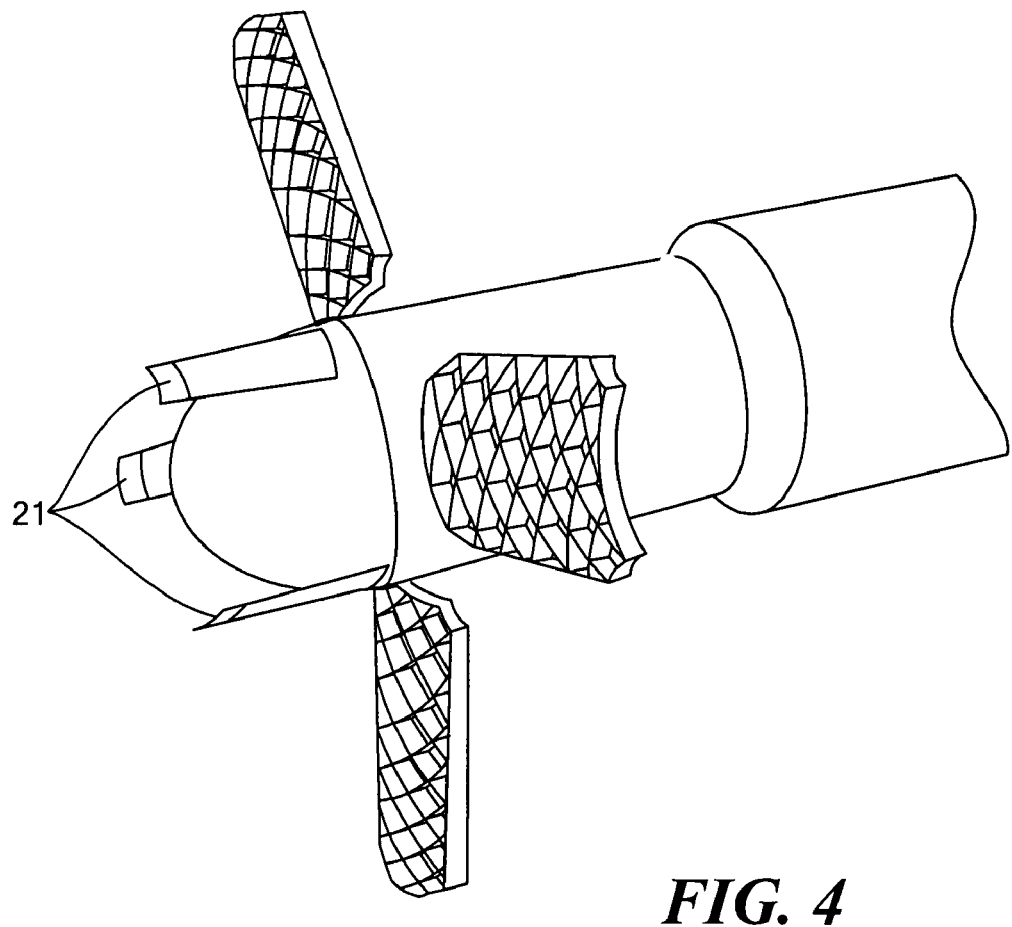
FIG. 4 is a partial isometric view of the aerial vehicle with the set of propeller blades in a streaming position during unpowered flight.
Figure 5:
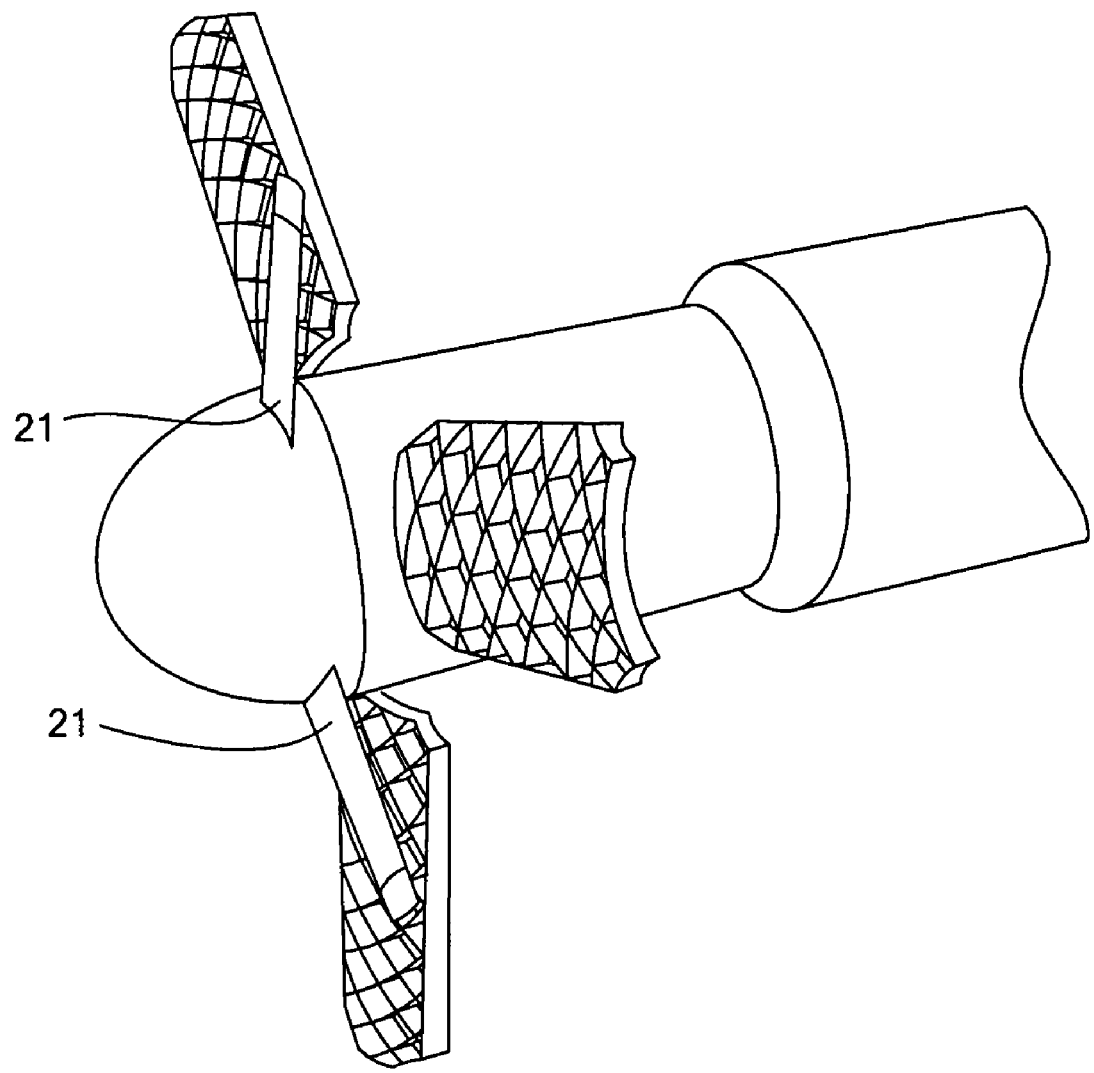
FIG. 5 is a partial isometric view of the aerial vehicle with the set of propeller blades deployed for powered flight.

The propeller blades 21 connected to the electric motor 23 are hinged to store folded forward against the fuselage. In one embodiment, referring to FIGS. 3-5, upon deployment, the propeller blades rotate through approximately 180° about their respective hinge axes such that they stream or trail aft to reduce drag during unpowered flight. See FIG. 4. This 180° swing may be driven by a suitable biasing mechanism, for example, by small torsion spring mechanisms at the propeller blade hinge, and by centrifugal force associated with rotation. Upon reaching the desired altitude for powered flight, the electric motor is activated and the trailing propeller blades are driven by centrifugal force normal to the shaft axis and lock into this position. See FIG. 5.

Figure 6:
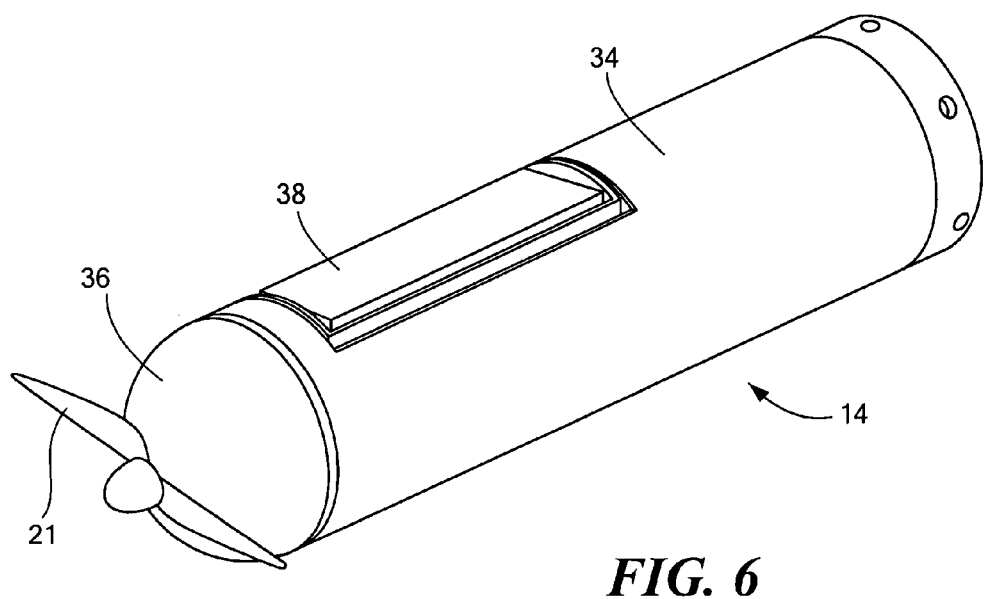
FIG. 6 is an isometric view of a payload section with a set of propeller blades.
Figure 7:
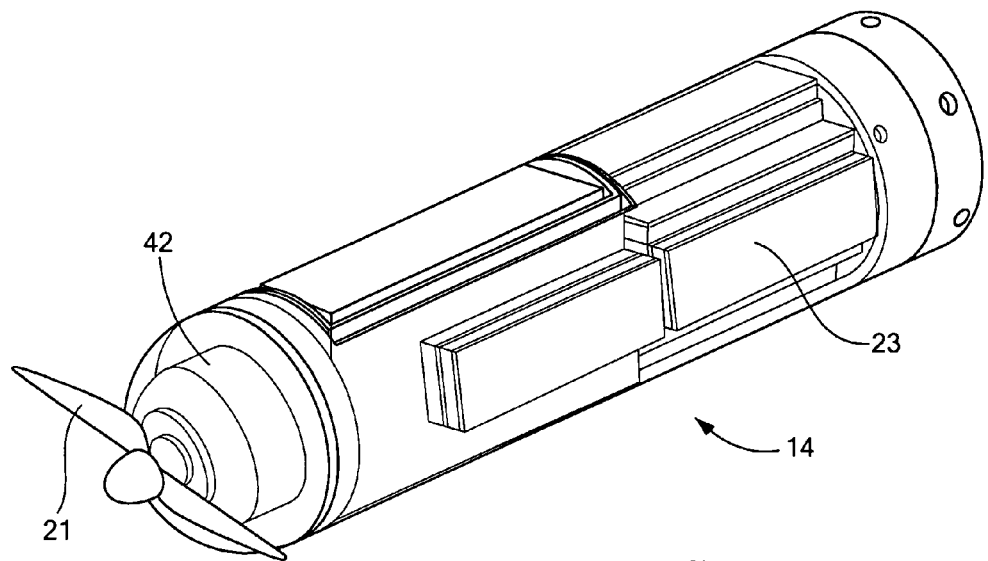
FIG. 7 is an isometric view of the payload section of FIG. 6 with outer housing removed.
Figure 8A:
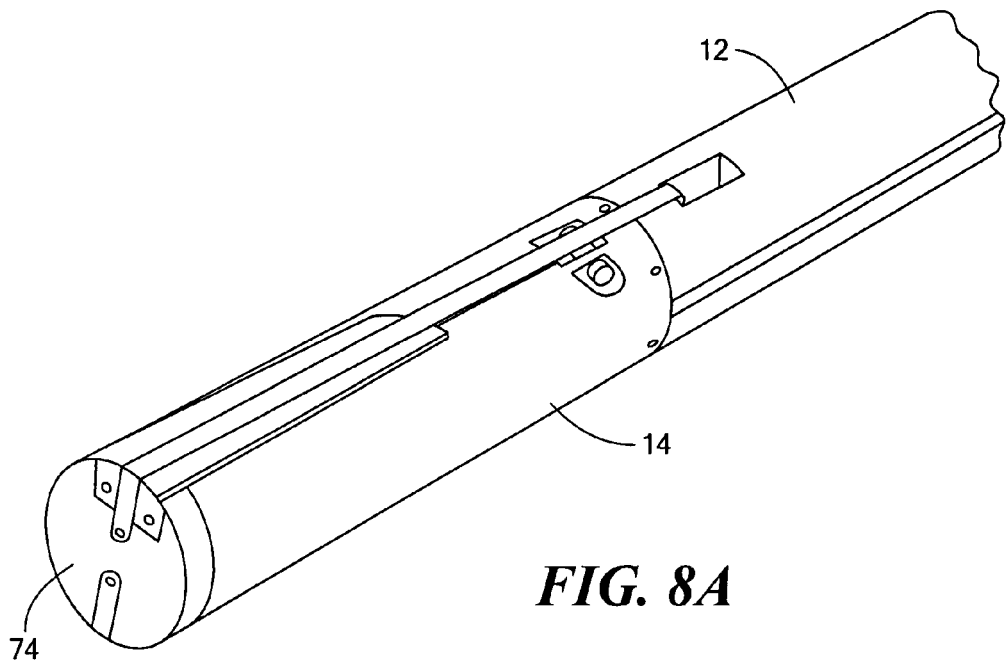
FIG. 8 is an isometric view of a recoverable aerial delivery system.
Figure 8B:
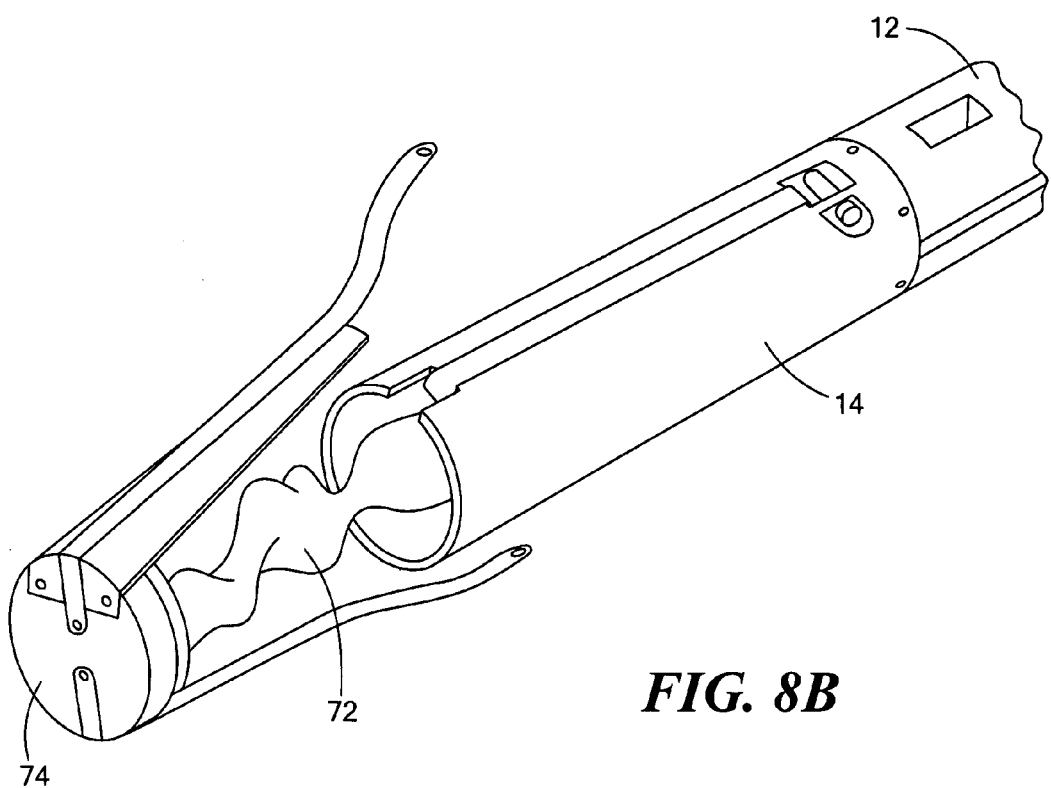
Figure 8C:
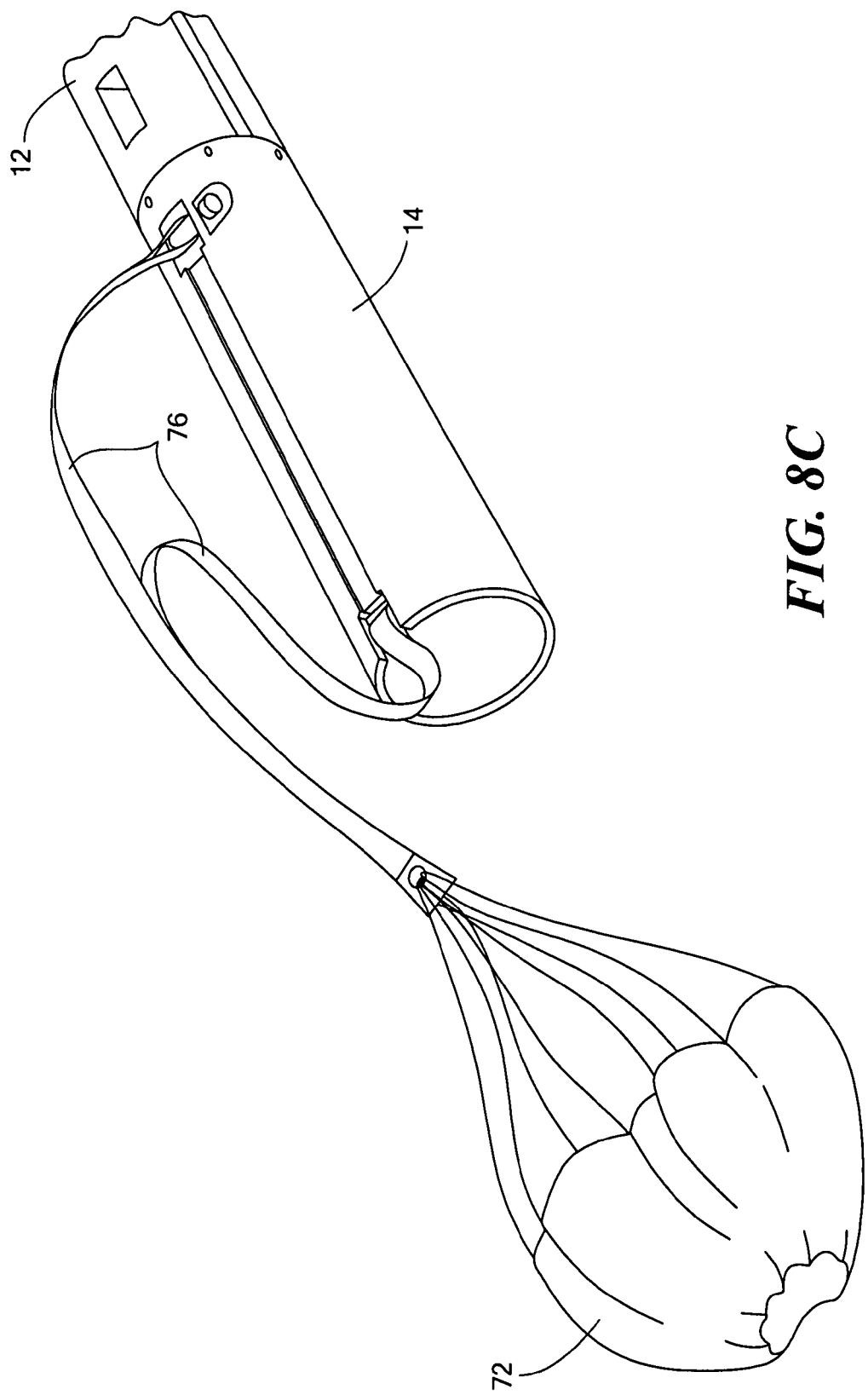
Figure 8D:
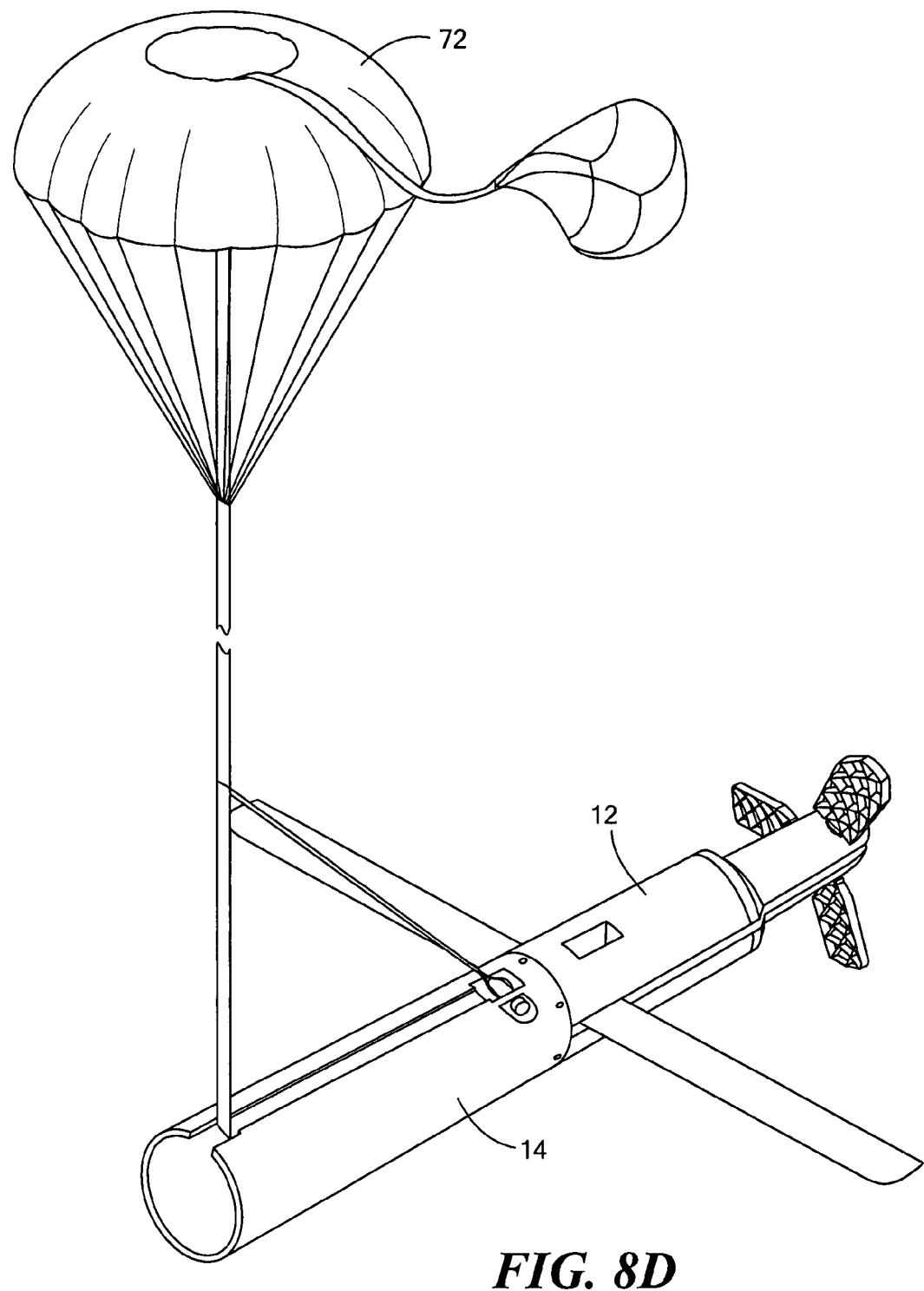
Figure 9:
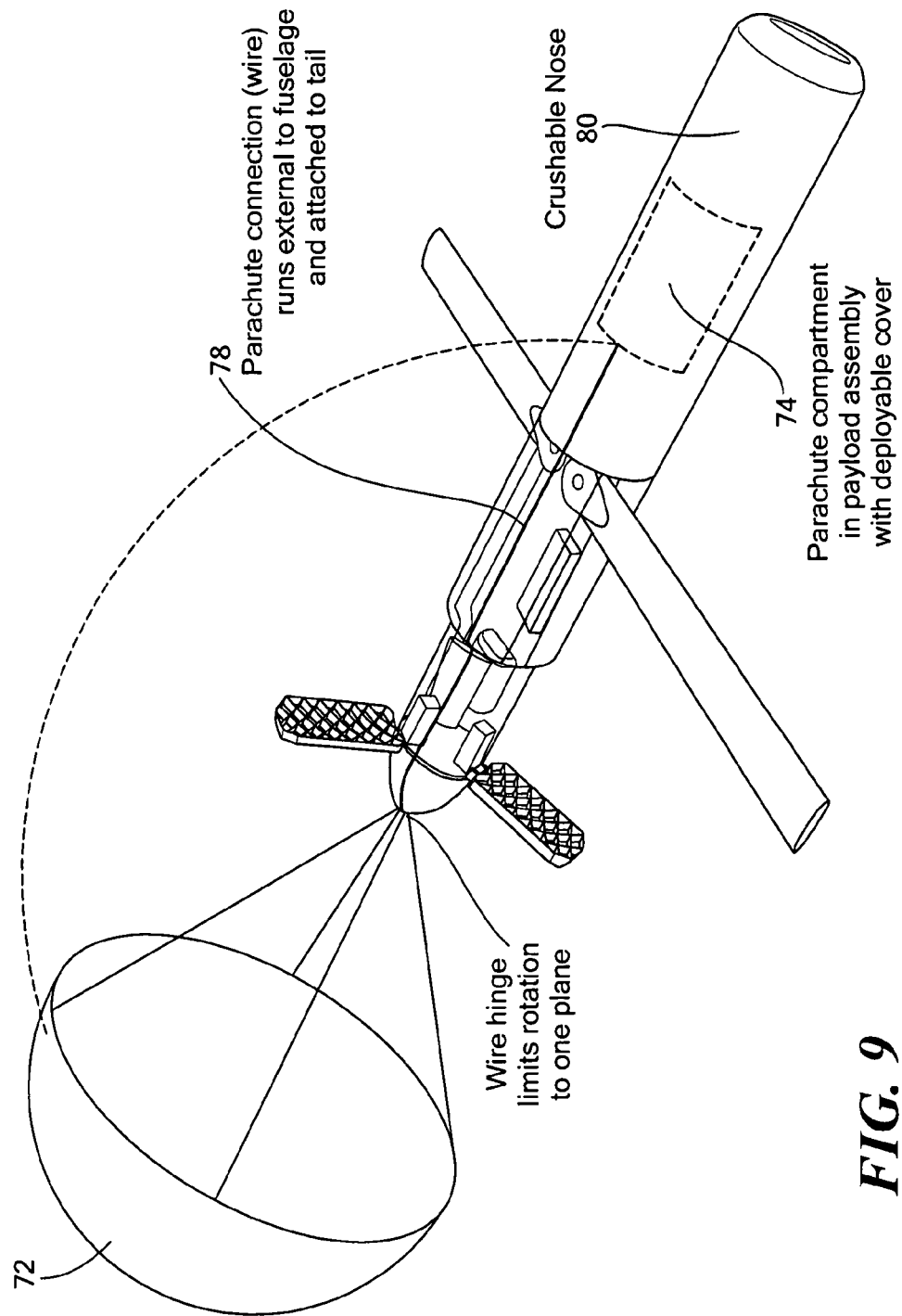
FIG. 9 is an isometric view of an alternative embodiment of a recoverable aerial delivery system.

In another embodiment, the propeller blades 21 are mounted to the front of the payload section 14. See FIGS. 6 and 7. FIG. 6 illustrates a payload section incorporating a cylindrical shell or housing 34 and a nose 36. A dropsonde dispenser 38 for dispensing a dropsonde for measuring meteorological data is mounted to the housing. The set of propeller blades 21 is mounted at the nose of the payload section to a motor 42 within the nose. See FIG. 7. A power source 23 is mounted within the housing. The propeller blades may be foldable or retractable, in any manner, such as is known in the art, to maintain a stowed position prior to deployment. For example, an outer shell may be removed from the payload section to allow the propeller blades to unfold and deploy.

During powered flight, the UAV flies in a determined pattern at a determined altitude. When a target is being tracked, the target is maintained in the sensor field of view, through a combination of sensor motion from gimbaled sensors and flight path control. Some image processing is necessary to determine the target azimuth and elevation relative to the vehicle axis. This information is coupled with the autopilot, so that wind effects and target motion can be calculated and suitable flight control commands issued to maintain a constant stand-off range when circling the target.

Upon completion of the operation and/or when reaching a target region, the payload may, in one embodiment, be jettisoned from the air delivery vehicle via a release mechanism 26 (FIG. 1). Upon command from the autopilot, the release mechanism releases a latch mechanism, decoupling the payload and the air delivery vehicle. Additional payloads, if carried, can be deployed in other locations. Once all payloads are delivered, the mission is completed, or the energy source is expended, the air delivery vehicle tumbles to the ground or falls into the sea and sinks to the bottom.

In another embodiment, the unmanned aerial vehicle is recoverable. Referring to FIGS. 8A-D and 9, a recovery parachute 72 is packaged in the forward payload section 14. This allows the UAV to be flown over land and recovered. In one embodiment, referring to FIGS. 8A-D, the parachute is contained in the front of the payload section by a cover assembly 74. Upon a suitable command, the cover assembly is released (e.g., by burn through resistors) and falls away. The parachute is tethered to the payload section by straps 76, which extend from the payload section. The parachute deploys and the UAV hangs therefrom while falling to earth.

In another embodiment (see FIG. 9), a suspension connection 78 extends between the stowed parachute and the tail of the UAV. The connection, such as a wire, conforms to the side of the fuselage with little drag. The stowed parachute is spring-loaded inside the payload section to eject laterally upon command. As soon as the parachute enters the airstream and starts to deploy, it is carried aft along the wire by its own drag. The parachute must not contact the fins or wings, or the propellers if present during deployment. Thus, the parachute ejection spring must be sufficiently stiff to throw the chute far enough laterally so that it clears the region of the wings, fins, and propellers. Also, the wire connection is hinged in such a manner that it can only rotate aft about the hinge axis. That is, it cannot rotate laterally. These provisions ensure that as the parachute deploys, it clears the fins, and the UAV hangs from the chute to land nose first. The parachute hatch door may be opened in any suitable manner. For example, a burn-through resistor may be provided to release the parachute hatch door 74 in the payload bay and initiate parachute deployment. After recovery, the now-crushed nose section 80 is removed and replaced, the parachute repacked and stored, and the UAV is readied for further flights.

It will be appreciated that the UAV can be used for any desired application. The UAV can be launched from launch systems other than sonobuoy launch systems. The invention is not to be limited by what has been particularly shown and described, except as indicated by the appended claims.

What is claimed is:

1. An unmanned aerial vehicle comprising:
   an air delivery vehicle including a fuselage defining an axis, and a payload section attached in front of the air delivery vehicle;
   a pair of wings pivotably mounted to the fuselage for movement from a stowed position against the fuselage to a deployed position extending from the fuselage;
   a plurality of tail fins pivotably mounted to the fuselage aft of the wings for movement from a stowed position against the fuselage to a deployed position extending from the fuselage;
   a plurality of propeller blades mounted to the air delivery vehicle for movement from a stowed position folded forward against the fuselage to an unpowered flight position trailing aft and further to a deployed position extending radially from the axis of the fuselage; and
   a drive source for driving the propeller blades in the deployed position about the axis of the fuselage.

2. The unmanned aerial vehicle of claim 1, wherein the plurality of propeller blades are mounted to the air delivery vehicle with a biasing mechanism biasing the blades into the unpowered flight position.

3. The unmanned aerial vehicle of claim 2, wherein the biasing mechanism comprises a torsion spring mechanism.

4. The unmanned aerial vehicle of claim 1, wherein the drive source overcomes the biasing mechanism to extend the blades radially from the fuselage by centrifugal force.

5. The unmanned aerial vehicle of claim 1, wherein the tail fins are pivotably mounted for rotation about an axis extending radially from the fuselage.

6. The unmanned aerial vehicle of claim 1, wherein the tail fins comprise lattice fins.

7. The unmanned aerial vehicle of claim 1, further comprising an autopilot programmable to follow a predetermined flight plan.

8. The unmanned aerial vehicle of claim 1, further comprising a wing deployment mechanism biased to move the wings to the deployed position.

9. The unmanned aerial vehicle of claim 1, wherein the payload section is releasably attached to the air delivery vehicle.

10. The unmanned aerial vehicle of claim 9, further comprising a release mechanism between the air delivery vehicle and the payload section.

11. The unmanned aerial vehicle of claim 1, wherein the release mechanism comprises a biasing mechanism disposed between the air delivery vehicle and the payload section.

12. The unmanned aerial vehicle of claim 1, wherein the payload section is fixedly attached to the air delivery vehicle.

13. An unmanned aerial vehicle comprising:
   an air delivery vehicle and a payload section attached to the front of the air delivery vehicle, the air delivery vehicle including a fuselage defining an axis;
   a pair of wings pivotably mounted to the fuselage for movement from a stowed position against the fuselage to a deployed position extending from the fuselage;
   a plurality of tail fins pivotably mounted to the fuselage aft of the wings for movement from a stowed position against the fuselage to a deployed position extending from the fuselage; and
   a recovery parachute releasably stowed in the payload section and spring-loaded to eject laterally from the payload section during deployment, and a connection between the recovery parachute in the payload section and a tail of the air delivery vehicle to carry the parachute aft during deployment.

14. The unmanned aerial vehicle of claim 13, wherein the connection between the recovery parachute and the tail comprises a wire.

15. The unmanned aerial vehicle of claim 13, further comprising an ejection spring in the payload section to eject the parachute out of the payload section.

16. The unmanned aerial vehicle of claim 13, further comprising a hatch door in the payload section, the recovery parachute stowed behind the hatch door.

17. The unmanned aerial vehicle of claim 1, wherein the propeller blades are mounted for rotation through approximately 180° from the stowed position to the trailing position.

* * * * *